(12) United States Patent
Rafie et al.

(10) Patent No.: US 7,079,574 B2
(45) Date of Patent: Jul. 18, 2006

(54) CARRIER PHASE RECOVERY SYSTEM FOR ADAPTIVE BURST MODEMS AND LINK HOPPING RADIO NETWORKS

(75) Inventors: Manouchehr S. Rafie, Sunnyvale, CA (US); Tushar Shah, Milpitas, CA (US); Syang-Myau Hwang, Cupertino, CA (US); Jun Lu, San Jose, CA (US)

(73) Assignee: Radiant Networks PLC, Essex (GB)

( * ) Notice: Subject to any disclaimer, the term of this patent is extended or adjusted under 35 U.S.C. 154(b) by 849 days.

(21) Appl. No.: 09/764,202

(22) Filed: Jan. 17, 2001

(65) Prior Publication Data

US 2002/0126748 A1    Sep. 12, 2002

(51) Int. Cl.
*H03H 7/30* (2006.01)

(52) U.S. Cl. .............. 375/232; 375/222; 375/350; 375/148; 375/233; 375/349; 375/341; 375/230; 370/330; 370/329; 708/442; 708/304; 340/17

(58) Field of Classification Search ........... 375/232, 375/222, 350, 148, 233, 349, 341, 229, 230; 370/348, 252, 346, 330, 329; 398/45; 709/208; 455/63.1; 708/442, 304; 340/17
See application file for complete search history.

(56) References Cited

U.S. PATENT DOCUMENTS

| | | | |
|---|---|---|---|
| 3,878,468 A | 4/1975 | Falconer et al. | |
| 3,974,449 A | 8/1976 | Falconer | |
| 4,253,184 A | 2/1981 | Gitlin et al. | |
| 4,422,175 A | 12/1983 | Bingham et al. | |
| 4,730,341 A | 3/1988 | Saito | |
| 5,014,283 A | 5/1991 | Baier | |
| 5,063,573 A | 11/1991 | Langewellpott | |
| 5,115,454 A | 5/1992 | Kucar | |
| 5,163,066 A | 11/1992 | Cupo et al. | |
| 5,260,972 A | 11/1993 | Wang | |
| 5,283,813 A | 2/1994 | Shalvi et al. | |
| 5,406,586 A | 4/1995 | Wang | |
| 5,418,817 A | 5/1995 | Richter | |
| 5,483,557 A | 1/1996 | Webb | |
| 5,533,050 A | 7/1996 | Isard et al. | |
| 5,574,979 A * | 11/1996 | West | 455/63.1 |
| 5,581,578 A | 12/1996 | De Bot | |
| 5,737,327 A | 4/1998 | Ling et al. | |
| 5,799,037 A | 8/1998 | Strolle et al. | |
| 5,799,047 A | 8/1998 | Dobrica | |
| 5,818,828 A * | 10/1998 | Packer et al. | 370/346 |
| 5,844,943 A | 12/1998 | Kazecki et al. | |
| 5,875,215 A | 2/1999 | Dobrica | |

(Continued)

FOREIGN PATENT DOCUMENTS

EP    0 117 626    9/1984

(Continued)

*Primary Examiner*—Chieh M. Fan
*Assistant Examiner*—Sudhanshu C. Pathak
(74) *Attorney, Agent, or Firm*—Pillsbury Winthrop Shaw Pittman, LLP (57) ABSTRACT

A method for a carrier phase recovery apparatus in a multiple-link hopping radio system includes hopping among a plurality of radio links to receive bursts of radio signals on the plurality of radio links and determining channel information for each radio link from a received burst on the radio link. Further, the method includes storing the determined channel information and using the determined channel information for the radio link to reliably recover the carrier phase of a next received burst on the radio link.

13 Claims, 5 Drawing Sheets

U.S. PATENT DOCUMENTS

| | | | |
|---|---|---|---|
| 5,878,085 A | 3/1999 | McCallister et al. | |
| 5,909,466 A | 6/1999 | Labat et al. | |
| 5,999,223 A | 12/1999 | Patel et al. | |
| 6,067,319 A | 5/2000 | Copeland | |
| 6,081,549 A | 6/2000 | Shou et al. | |
| 6,175,860 B1* | 1/2001 | Gaucher | 709/208 |
| 6,363,062 B1* | 3/2002 | Aaronson et al. | 370/348 |
| 6,426,814 B1* | 7/2002 | Berger et al. | 398/45 |
| 6,483,821 B1* | 11/2002 | Dabak et al. | 370/329 |
| 6,570,910 B1* | 5/2003 | Bottomley et al. | 375/148 |
| 6,751,196 B1* | 6/2004 | Hulyalkar et al. | 370/252 |
| 6,831,958 B1* | 12/2004 | Rouvellou | 375/350 |
| 6,850,502 B1* | 2/2005 | Kagan et al. | 370/330 |
| 6,874,006 B1* | 3/2005 | Fu et al. | 708/442 |
| 2002/0057733 A1* | 5/2002 | Sullivan | 375/222 |
| 2002/0196844 A1* | 12/2002 | Rafie et al. | 375/232 |

FOREIGN PATENT DOCUMENTS

| | | |
|---|---|---|
| EP | 0 347 394 | 12/1989 |
| EP | 0 999 717 A2 | 5/2000 |
| WO | WO 96/34481 | 10/1996 |
| WO | WO 99/23796 | 5/1999 |
| WO | WO 00/16526 | 3/2000 |

* cited by examiner

CARRIER PHASE RECOVERY SYSTEM FOR ADAPTIVE BURST MODEMS AND LINK HOPPING RADIO NETWORKS

BACKGROUND

This invention relates to a carrier phase recovery subsystem employed in fixed Broadband Wireless Access (BWA) applications operating in adaptive burst modems and multi-link hopping mesh radio networks over slow time-varying channels. The adaptive modem is capable of fast link-hopping from one link to another over such channels. That is the channel is quasi-static from burst to burst for any given link.

The embodiments described herein may be used in conjunction with a wireless mesh topology network of the type described in U.S. patent application Ser. No. 09/187,665, entitled "Broadband Wireless Mesh Topology Networks" and filed Nov. 5, 1998 in the names of J. Berger and I. Aaronson, and with network nodes including switched multi-beam antenna designs similar to the design described in U.S. patent application Ser. No. 09/433,542, entitled "Spatially Switched Router for Wireless Data Packets" and filed in the names of J. Berger, et al., as well as with the method and apparatus disclosed in U.S. patent application Ser. No. 09/699,582 entitled "Join Process Method For Admitting A Node To A Wireless Mesh Network, filed Oct. 30, 2000 in the names of Y. Kagan, et al. Each of these U.S. patent applications is incorporated herein by reference.

Burst transmission of digital data is employed in several applications such as satellite time-division multiple access, digital cellular radio, wideband mobile systems and broadband wireless access systems. The design trade-offs and the resulting architectures are different in each of these applications.

In most of these applications, a preamble of known symbols is inserted in the beginning of each burst of data packets for synchronization purposes. Data-aided (DA) algorithms are normally employed for good performance for short preamble. However, synchronization becomes difficult at low values of signal-to-noise ratio (SNR).

Coherent detection schemes are superior compared to differential coherent or non-coherent schemes in terms of power efficiency. However, carrier phase recovery required for coherent detection is influenced by a time-varying characteristic of a fading channel. The power efficiency presented by coherent detection in a digital communication system is effective only if carrier phase synchronization techniques are provided for the receiver.

A constant need for ever-increasing throughputs through fixed bandwidths, fueled by broadband IP (Internet protocol) applications, has pushed system designers toward more throughput-efficient modulation schemes. Because of their relatively good performance, large quadrature amplitude modulation (QAM) constellations are being used in many of these applications. One of the critical problems associated with the use of large QAM constellations is that of carrier phase estimation, which for efficiency reasons, must often be done without the use of a preamble, particularly in burst modem applications. The problem is further complicated for cross-talk interference between the quadrature components (i.e., I/Q channels).

For coherent detection, there are two basic approaches to establish carrier phase synchronization at the receiver. One is pilot based where a known signal is inserted at the transmitter that allows the receiver to extract the pilot symbol and synchronize its local oscillator to the carrier phase of the received signal. Known symbols are multiplexed with the data sequence in a ratio of p pilots to m data symbols. At the receiver, the incoming waveform is filtered and sampled at the symbol rate. The sample sequence is split into two streams; a data stream and a reference stream of known symbols. The latter is decimated and only the samples corresponding to pilot symbols are used for further processing. A narrow band phase-locked loop (PLL) is typically employed to acquire and track the carrier component of the received signal.

Such an approach is not appropriate in applications involving transmission of short bursts. The insertion of a known data sequence greatly reduces the transmission efficiency for a short burst. As a result, pilot-aided algorithms are not applicable in such systems.

In the second approach, the carrier phase estimate is derived directly from the modulated signal. This approach is much more prevalent in practice due to its distinct advantage that the total transmitter power is allocated to the transmission of the data symbols. Transmission efficiency is optimized.

The effect of carrier phase error, $\phi_e = \phi - \hat{\phi}$, in high-level modulation schemes, such as M-QAM is to reduce the power of the desired signal component by a factor of $\cos^2(\phi - \hat{\phi})$ in addition to the cross-talk interference from the in-phase and quadrature components. Since the average power level of the in-phase and quadrature components is the same, a small phase error causes a large degradation in performance, particularly at higher modulation levels (i.e., $M \geq 16$).

In continuous modem applications, the user is typically willing to wait a few seconds while the receiver goes through an acquisition phase in which tracking processes converge. Often, the acquisition process in a continuous modem simply allows phase-locked loops to pull in on the received signal. In other words, the acquisition processing is not different from the tracking processing.

In contrast, in a burst modem, the user data content of a given transmission may be only a fraction of a millisecond. Long acquisition times contribute an unacceptable level of overhead to the system and substantially reduce capacity. Thus, the burst modem requires a special acquisition process that will quickly estimate the appropriate receiver gain, the carrier frequency and phase, the sample timing frequency and phase, and, if needed, the equalizer taps for an equalizer of the receiver. Also, the acquisition process must reliably identify which bit in the burst is the first user data bit so that higher layers of the protocol stack can format data properly.

The initial carrier phase can be estimated using the phase of the output of a coherent correlator. This phase is an estimate of the phase of a sample in the middle of the preamble. If we desire estimates of the phase at the beginning or the end of the preamble, the estimate from the middle must be compensated by the frequency error estimate. Since the frequency error estimate is not perfectly accurate, use of it for this compensation will degrade the accuracy of the phase estimate formed for the preamble ends. Thus, it should be carefully considered whether to start tracking from either end of the preamble or whether starting in the middle is the best route.

Another important design decision is the choice of the estimator topology. In continuous modem applications, closed-loop (feedback) structure is commonly used with relatively high performance depending on the application. However in burst modem systems, closed-loop structures do not produce the best results. Feedback systems require, in general, longer tracking time (i.e., long data sequence) for an acceptable performance level in many applications. This requirement is typically not met in burst modems where the burst length could be in the low microseconds (i.e., 20 to 40 octets).

Accordingly, there is a need for a method and apparatus for carrier phase recovery in a burst mode system. Further, there is a need for a method and apparatus for carrier phase recovery in a link hopping system using transmission bursts for radio communication.

BRIEF SUMMARY

By way of introduction only, the present invention provides a method for receiving radio signals in a multiple-link hopping radio system. The method includes hopping among a plurality of radio links to receive bursts of radio signals on the plurality of radio links and determining channel information for each radio link from a received burst on the radio link. Further, the method includes storing the determined channel information and using the determined channel information for the radio link to reliably receive a next received burst on the radio link.

The invention further provides a method for receiving radio signals which includes receiving a first burst of a first radio signal on a first radio link and determining channel information about the first radio link using the first burst. The method further includes receiving a next burst such as a second burst of the first radio signal or a first burst of a second radio signal on a second radio link and, subsequently, receiving a next burst of the first radio signal on the first radio link using the channel information.

The invention further provides a carrier phase recovery method for use in a multiple-link hopping, burst adaptive modem. The method includes receiving a modulated carrier signal as a series of bursts, each burst including one or more pilot symbols and data symbols and forming a coarse estimation of carrier phase using the one or more pilot symbols. Further, the method includes forming a fine estimation of carrier phase using the coarse estimation of carrier phase to estimate carrier phase for a burst using data symbols of the burst, and correcting carrier phase for the radio signal using the fine estimation of carrier phase.

The invention further provides carrier phase recovery system. The system includes a fixed equalizer configured to equalize a present burst of data using equalizer weights from a previous burst of data generated by an adaptive equalizer. The present burst of data includes pilot symbols and data. The system further includes a carrier phase recovery unit which recovers phase for the present burst of data using the pilot symbols and a mixer combining a delayed present burst of data and the recovered phase. The system still further includes an adaptive equalizer which equalizes the present burst to produce an equalized output signal and provides next burst equalizer weights to a fixed equalizer for equalizing a next burst of data.

The invention further provides a phase correction apparatus which includes in one embodiment means for receiving a distorted signal and means for compensating for the phase of the distorted signal. The compensating means includes means using known pilot symbols in the distorted signal for obtaining a coarse estimate of carrier phase for the distorted signal, and means using data symbols of the coarse phase-compensated signal to produce a fine carrier phase estimate.

The invention further provides a carrier phase recovery system for use in a multiple-link hopping and burst adaptive modem in steady state operation. In one embodiment, the carrier phase recovery system includes a memory and a fixed equalizer for equalizing a present data burst of a present link for which the tap coefficients pertinent to a previous burst. The carrier phase unit includes a first stage which acquires a coarse estimate of the carrier phase offset using a pilot-aided technique using multiple known pilot symbols contained in the present burst of data, a fixed phase bias removal stage coupled to the first stage and a phasor generating stage coupled to the fixed phase bias removal stage. The carrier phase unit further includes a de-rotating means for de-rotating the filtered (equalized) signal by a phasor signal generated by the phasor generating stage to remove estimated coarse carrier phase from the filtered signal to produce a coarse phase-compensated signal. The carrier phase unit further includes a data-aided phase estimator stage for removing modulated signal from the coarse phase-compensated signal using a data-aided, decision-directed technique, an averaging means for averaging N symbols from the data-aided phase estimator stage to reduce noise variance, and an equalizer stage for generating the tap coefficients and storing the tap coefficients in the memory.

The foregoing discussion of the preferred embodiments has been provided only by way of introduction. Nothing in this section should be taken as a limitation on the following claims, which define the scope of the invention.

DETAILED DESCRIPTION OF THE PRESENTLY PREFERRED EMBODIMENTS

This invention relates to the carrier phase recovery subsystem for a link-hopping wireless mesh network topology used for Broadband Wireless Access (BWA) networks. Such networks operate in different spectra such as in the Local Multi-point Distributed Service (LMDS) band at 28 GHz. The modem of a node in such a network is capable of fast link-hopping from one link to another over slow time-varying channels. That is, the channel is quasi-static from burst to burst for any given link. A carrier phase estimation technique is provided for a coherent detection of high-speed short-burst multi-link hopping mesh network topology using, for example, fixed Broadband Wireless Access (BWA).

Fading in fixed line-of-sight (LOS) channels, although mild compared to mobile systems, provides disruptive effects for phase tracking. The use of closed-loop systems, such as phase-locked loops or modified Costas phase trackers, is not appropriate for burst modem applications. In these environments, closed-loop systems typically fail to provide improved performance due to their large cycle-slip rate in fading channels and/or slow convergence rate in short-burst broadband applications.

The present embodiments are designed to enhance performance as compared to non-coherent M-ary modulation schemes through employing fast and efficient algorithms, while maintaining low-implementation complexity and high-throughput efficiency. A pilot-aided coherent phase estimation technique along with a decision-directed scheme are the scope of this embodiment for extracting the carrier phase of the transmitted signal in a time-varying channel environment involving a dynamic mesh networks employing high-speed, short-burst data.

To achieve coherent detection in a short-burst and high-speed mesh infrastructure, reliable carrier phase recovery must be performed. In principle, non-aided schemes alone are most efficient, however, their performance becomes critical even for a very robust modulation signaling (i.e., B/QPSK) when operating in low signal-to-noise ratio (SNR) and/or the channel is impaired by fading.

In the burst mode, the carrier phase recovery unit of the present embodiments conducts a multiple-stage phase recovery scheme. First, the received signal is matched filtered and is passed through a fixed T/N-spaced equalizer to compensate for the phase and amplitude variations of the link under the operation. When a new burst of a particular link is received in the mesh topology (multi-point to multi-point), the weights of the fixed equalizer for that link are updated based on the tap coefficients of an equalizer which has operated on the previous burst of the corresponding link. In this embodiment, the tap coefficients of the fixed equalizer are loaded from memory into a T/2-spaced equalizer. That is, in the present embodiments, each node has N sets of tap coefficients stored in its local memory corresponding to its N neighboring nodes.

The present embodiments provide a novel and improved method and system for carrier phase recovery. The estimation of carrier phase is conducted in two distinct modes. The first mode is the join mode where a new node is invited to join a mesh radio system. In this mode, the carrier phase is estimated through a long sequence of known, un-modulated, pilot symbols.

In the second mode, the carrier phase is estimated when the mesh infrastructure is in a burst or steady-state operation. The focus of this discussion is primarily on this mode of the carrier phase estimation. Although there are a number of traditional closed-loop phase recovery techniques (i.e., PLL, Costas loop, etc.) available and cited in the literature, the present embodiments utilizes a novel multi-stage open-loop structure to efficiently operate with a burst modem within the existing mesh network capable of link hoping on a burst by burst basis.

Figure 1:
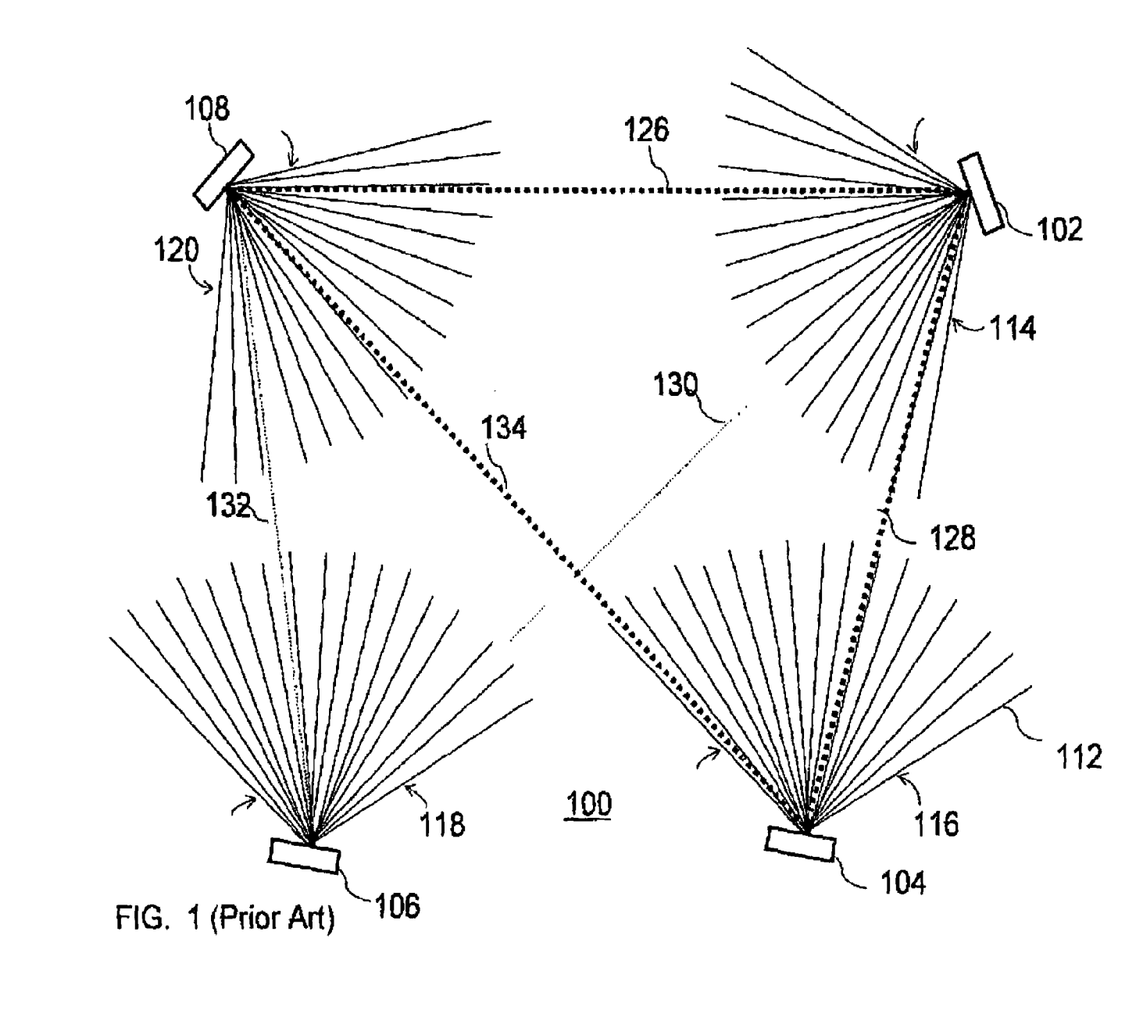
FIG. 1 is a block diagram of a link hopping wireless network having a mesh topology.

FIG. 1 is a block diagram of an exemplary wireless radio network 100 employing a mesh topology. The network 100 as illustrated in FIG. 1 includes a first node 102, a second node 104, a third node 106 and a fourth node 108 in radio communication. The network 100 may include any number of nodes. The four nodes shown in FIG. 1 are exemplary only. In the embodiment of FIG. 1, the network 100 is a wireless mesh topology network of the type described in U.S. patent application Ser. No. 09/187,665, entitled "Broadband Wireless Mesh Topology Networks" and filed Nov. 5, 1998 in the names of J. Berger and I. Aaronson.

Each node 102, 104, 106, 108 includes data processing apparatus and a radio for communication of data with remote radios, such as other nodes of the network 100. Each node in the exemplary embodiment includes a directional antenna that provides radio communication on a number of sectors. The sectors provide radio coverage over a portion of the geographic area near a node. Thus, node 104 includes sectors 112 providing coverage over an area 116 which includes node 102. Node 102 provides coverage over an area 114. Node 106 provides coverage over an area 118, and node 108 provides coverage over an area 120.

Nodes 102, 104, 106, 108 of the network 100 are considered peers. They are free to communicate with one another on an equal basis. This is in distinction to a hierarchical system such as base stations communicating with subscriber units in a cellular radiotelephone system. Communication among the nodes 102, 104, 106, 108 is peer-to-peer communication.

Two nodes are in radio communication when their antenna sectors align. In that case, the nodes may complete a radio link and exchange data and control information. Thus, node 102 and node 104 communicate on link 128, node 102 and node 108 communicate on link 126, and node 104 and node 108 communicate on a link 134.

The fixed broadband wireless network 100 operates in two modes. A first mode is referred to as the acquisition/join mode. A second mode is referred to as the steady-state or burst mode. Operation will be described in greater detail below in conjunction with FIGS. 3–5. In the first mode of operation, the present invention obtains an accurate estimate of the carrier phase through averaging the estimated phase of K inserted pilot symbols into the designated slot of the join packet. In one embodiment, K=32. The join process will be described in greater detail below in conjunction with FIGS. 6 and 7. The join process may be of the type described in U.S. patent application Ser. No. 09/699,582 entitled "Join Process Method For Admitting A Node To A Wireless Mesh Network, filed Oct. 30, 2000 in the names of Y. Kagan, et al.

In the exemplary embodiment of FIG. 1, node 106 may be considered a joining node which is in the process of joining the network 100 including existing nodes 102, 104, 108. The joining node 106 receives invitation packets from the existing nodes 102, 104, 108 and can thus establish radio communication with node 102 on a link 130 with node 103 and on a link 132 with node 108.

Figure 2:
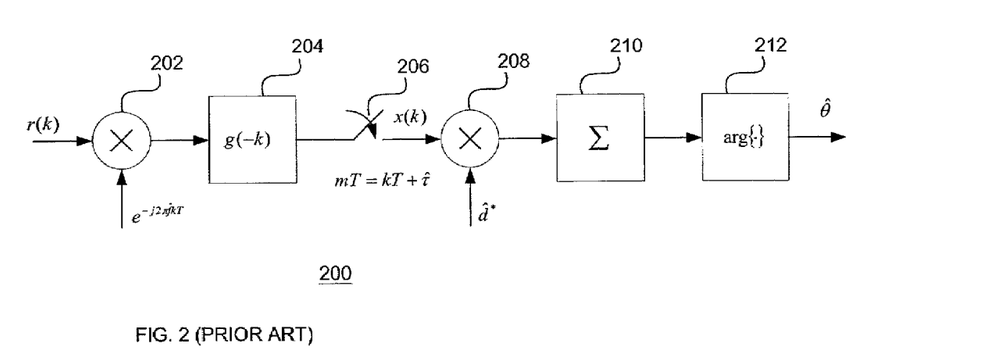
FIG. 2 shows a general block diagram of a prior art maximum likelihood (ML) carrier phase recovery system.

FIG. 2 is a block diagram of a prior art maximum likelihood carrier phase recovery system 200. FIG. 2 illustrates a generic block diagram of a Maximum Likelihood (ML) phase estimator. The parameter $\hat{f}$ is the frequency offset, $\hat{\tau}$ represents the timing phase, $\{\hat{d}(m)\}$ are the information symbols, g(k) is the square-root raised-cosine matched filter (signaling pulse shape), T is the symbol period, and $\hat{\theta}$ is the carrier phase to be estimated.

All parameters, $\hat{f}$, $\hat{\tau}$, $\{\hat{d}(m)\}$, and the pulse-shaping filter, g(k), are assumed to be known to the receiver. The phase $\hat{\theta}$ is the only unknown constant, taking values in the range of $\pm\pi$. The knowledge of the data symbols may come from either a decision-directed scheme or a known preamble (pilot symbols). The symbol epoch and carrier frequency values are estimated in advance and independently of carrier phase and are accurately tracked between bursts.

The system 200 illustrates the operations necessary to recover the carrier phase in a radio receiver of the system 100. The system 200 is an idealized or canonical representation. Actual embodiments of a system which can accomplish the illustrated operations requires an accurate and efficient estimate of $\{\hat{d}(m)\}$ within the context a multi-hopping link system. Forming an effective and efficient embodiment is particularly compounded in the present system where short bursts comprising the pilot signal of only two symbols are implemented for system efficiency reasons.

The carrier phase recovery system 200 includes a mixer 202, a filter 204, a sampler 206, a multiplier 208, a summer 210 and an angle determination block 212. The system 200 receives a signal r(k) which includes received data samples. The filter 204 is a matched filter having a filter response g(−k) which matches to the transmitter pulse shaping filter g(k).

The sampler 206 samples the output signal every T seconds, producing the signal x(k) which has a timing phase shift equal to $\hat{\tau}$. The multiplier 208 multiplies the signal x(k) by the signal {$\hat{d}$*} which is a known signal or known data, or an estimate thereof. In the present embodiment, $\hat{d}$* is a known pilot signal in the first stage of the carrier phase recovery system and an estimate of an unknown data in the second stage, respectively. The product signal which is provided to the summer 210. The multiplier 208 de-rotates the received signal. The summer 210 averages symbols over a time period corresponding to an observational window of interest. The angle determination block 212 extracts the angle associated with the data and produces an angle $\hat{\theta}$. This angle corresponds to the phase offset or phase error of the received data.

As noted above, the system 200 of FIG. 2 is a canonical form for estimation of carrier phase. However, in the system of FIG. 1, radio signals are received as short bursts including short (e.g., two-symbol) pilot signals. Also, the system of FIG. 1 is a link hopping system in which one radio signal is received on a frequency during certain receive times. The receive times may be interspersed with times during which other signals are received. The embodiments illustrated below relate to a system and method for recovering carrier phase in a link-hopping, burst-mode radio receiver.

Figure 3:
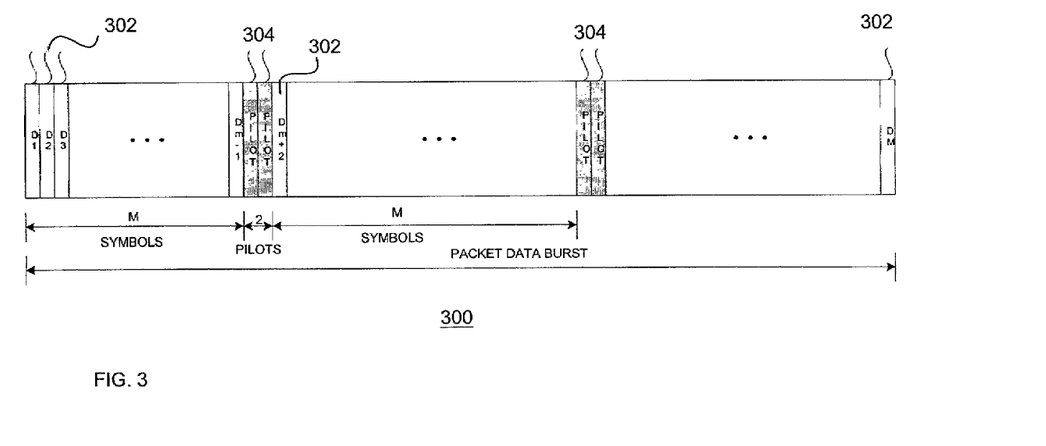
FIG. 3 illustrates frame construction of a transmitted burst in the wireless network of FIG. 1.

FIG. 3 illustrates a frame format of a transmitted burst 300 in the wireless network 100 of FIG. 1. The burst 300 is of the type used for on-going, burst mode communication among nodes of the network 100 and is distinct from a burst used in the join process to be described below in conjunction with FIG. 6. The burst 300 is one example of a data burst. As is shown in FIG. 3, the burst 300 includes data symbols and known pilot symbols 304 at a known timing position inside the data burst. Two pilot symbols are used in the illustrated embodiment, but any suitable number could be used. The pilot symbols are inserted between data symbols of the packet data burst 300. The packet may contain any suitable number of symbols. In the illustrated embodiment, m is the number of data symbols per packet and is chosen to be 32. This frame structure embeds the pilot symbols in the data for reliable phase estimation and data recovery.

The present embodiments include a carrier phase estimation unit which includes a fixed equalizer to compensate for the phase and amplitude variations of individual links capable of operating on multiple links independently, a pilot-symbol-based estimation apparatus to produce a coarse estimate of the value of the carrier phase, a decision-directed phase recovery method to provide the estimates of the symbol data in order to remove the modulating signals, and an averaging and phase extraction means to generate the final phase estimate.

The combination of a fixed equalizer, pilot-based coarse phase estimation, decision-directed data estimator, a smoothing filter, and a phase extractor means over M symbols which are all implemented in an open loop (feed-forward) structure brings about improvements in carrier phase tracking capability and provides an accuracy which is very close to the Modified Cramer-Rao bound (MCRB ($\theta$)).

The individual aspects of the present embodiments each provide respective system and performance enhancements when used alone or in conjunction with either prior art designs or disclosed elements.

Figure 4:
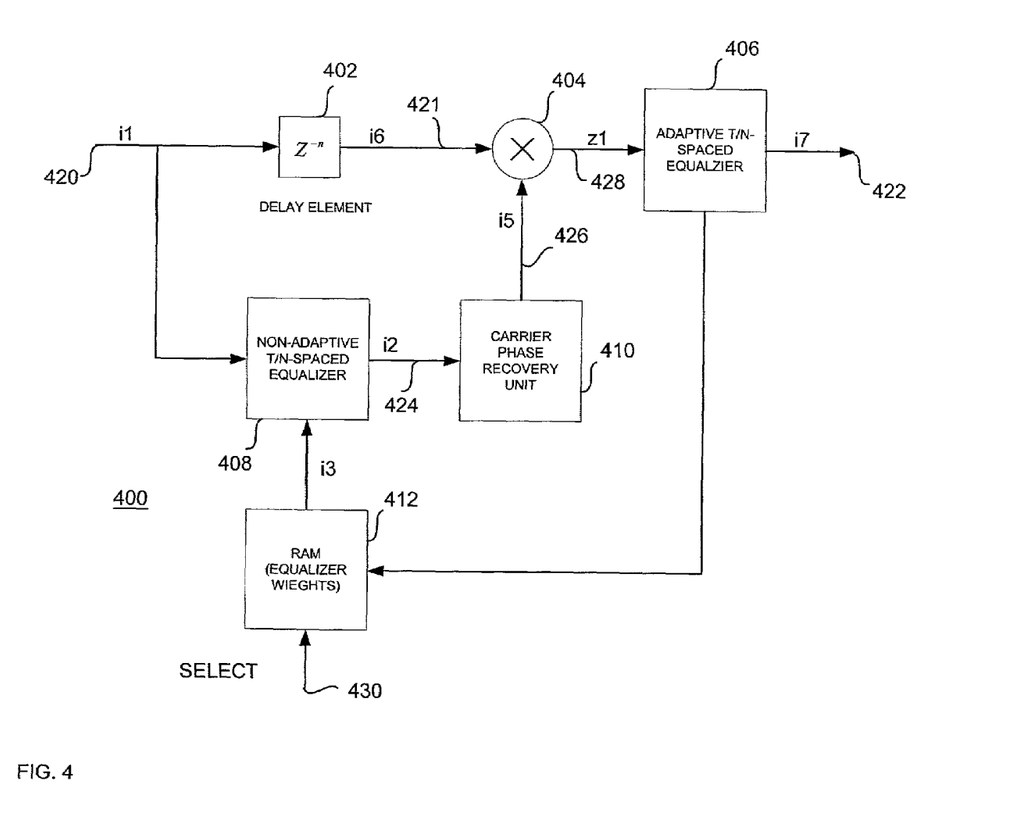
FIG. 4 is a block diagram of a carrier phase synchronization system for use in a node of the wireless network of FIG. 1 in burst-mode operation.

FIG. 4 is a block diagram of a carrier phase synchronization system 400 for use in a node of the wireless network of FIG. 1 in burst mode operation. The system 400 forms an overall carrier phase recovery system. The system 400 may be implemented in a radio receiver which receives a modulated signal as a series of bursts of data on a plurality of links in a link hopping radio communication system such as the system 100 of FIG. 1. In particular embodiments, each burst may include one or more pilot symbols and data symbols. In one embodiment, the radio receiver including the system 400 operates in the local multipoint distribution service (LMDS) band at 28 GHz on a channel that is slowly changing with time. The radio receiver receives broadcasts of quadrature amplitude modulated (QAM) data. The radio receiver hops among a plurality of radio links to receive bursts of radio signals on the plurality of radio links. Depending on the configuration of the particular network, the bursts received at the receiver on a particular channel from a particular transmitter may be interleaved with bursts from other transmitters on other channels. Applications with other systems having other operational features are possible, as well.

In this exemplary embodiment, each burst of data may have the format illustrated in FIG. 3. The pilot symbols are chosen to be at maximum amplitude corners of the QAM constellation. As shown in FIG. 3, in the time domain, the pilot symbols may be located near the center of the burst, which is, for example, 32 symbols in duration. The carrier phase synchronization system 400 of FIG. 4 uses the inserted pilot symbols and the estimated data symbols to accurately recover the carrier phase offset for the short bursts.

The system 400 includes a delay element 402, a mixer or multiplier 404 and an adaptive equalizer 406. The system further includes a non-adaptive equalizer 408, a carrier phase recovery unit 410 which recovers phase for the present burst of data using pilot and data symbols, and a memory circuit 412. Upon receipt of an initial burst (signal i1 in FIG. 4) at an input 420, the burst or symbols of the burst is delayed in the delay block 402. The delayed data (signal i6 in FIG. 4) on line 421 are multiplied in the multiplier by a carrier phase estimate (signal is in FIG. 4) on line 426 from the carrier phase recovery unit 410. The multiplier or mixer 404 combines a delayed present burst of data and the recovered phase estimate to produce a phase-error compensated signal (signal z1 in FIG. 4) on the line 428. Structure and operation of the carrier phase recovery unit 410 will be described in more detail below in conjunction with FIG. 5.

The output signal z1 from the multiplier 404 is provided on line 428. The signal is provided to the adaptive equalizer 406 which compensates for phase and amplitude variations of the channel. The equalizer 406 produces an equalized output signal (signal i7 in FIG. 4) and provides next burst equalizer weights to the fixed equalizer 408 for equalizing a next burst of data. In the illustrated embodiment, the next burst equalizer weights are stored in memory 412 but separate storage may be omitted. The equalizer 406 performs a T/N-spaced adaptive equalization process and an equalized and carrier phase error compensated signal is produced at the output 422. As part of the adaptive equalization process, equalizer weights are produced by the adaptive equalizer 406. These equalizer weights correspond to the particular link from which received radio signals are currently processed. The adaptive equalizer 406 compensates for amplitude and carrier phase variations in the channel and/or provides appropriate channel side information for each radio link from the received burst on the radio link. Other techniques of characterizing the channel or link may be used instead of or in addition to determining equalizer weights or carrier phase.

The equalizer weights, channel phase or other determined channel information are stored in the memory 412. In the illustrated embodiment, the memory 412 is a random access memory. In alternative embodiments, other storage devices may be substituted. In a link-hopping network embodiment, such as the network 100 of FIG. 1, the equalizer weights are preferably stored in accordance with an indication of the link with which they are associated. In this manner, in response to a select signal received at an input of the memory 430, the equalizer weights may be retrieved (signal i3 in FIG. 4) from the memory 412 for use in equalization of a subsequent burst. When each subsequent burst for a particular link is received, the adaptive equalizer 406 updates the equalizer weights for the next received burst using the current equalizer weights or other determined channel information from a received burst. The adaptive equalizer 406 then stores the updated equalizer weights in the memory 412.

The equalizer 408 receives the stored equalizer weights as signal i3 from the memory 412. As noted, in a multiple-link or link-hopping system, the stored equalizer weights are preferably retrieved from the memory according to the link to be received. The equalizer 408 uses the equalizer weights or other determined channel information for the radio link to reliably receive a next received burst on the radio link. That is, when the next burst for that particular link is received, the SELECT signal is asserted at the input 430 to the memory 412 to retrieve the equalizer weights previously stored for the link. The equalizer 408 produces an equalized signal using the retrieved equalizer weights. The equalized signal is provided to the carrier phase recovery unit 410 on a line 424.

FIG. 4 illustrates the top-level block diagram of the carrier phase estimator unit according to one embodiment in which a carrier phase synchronizer and a fixed or non-adaptive equalizer 408 preceding the phase estimator 410 are combined. The non-adaptive equalizer 408 pre-compensates for the phase and amplitude variations of the received symbols of the j-th burst of the l-th link, l=1, . . . , N (where N is the number of neighbors associated with any given node.) The tap coefficients of the fixed equalizer 408 are the same as the tap coefficients of an adaptive equalizer employed after the carrier phase recovery unit 410 operated on the j−1-st (previous) burst of the l-th link.

In the preferred embodiment, the carrier phase recovery unit 410 provides the carrier phase estimates of every j-th burst of all N neighboring links, $\{\hat{\theta}(j,l);l=1, \ldots, N\}$, independently. The carrier phase recovery means is employed in one application in a multi-hopping link topology such as a mesh architecture. All elements of the present invention are preferably constructed in a digital system.

The transmitted signal, channel multiplicative distortion, and the additive white Gaussian noise corresponding to the j-th burst of the l-th link at the sampling instant i are denoted by the complex signals $s(i,j,l)$, $c(i,j,l)=\alpha(i,j,l)e^{j\phi(i,j,l)}$ and $n(i,j,l)$, respectively. Then, the received symbols for the l-th link is defined as:

$$i1(i,j,l)=c(i,j,l) \cdot s(i,j,l)+n(i,j,l) \quad 1)$$

The received complex signals are assumed to be carrier frequency offset compensated, matched filtered, and the timing phase parameter is accurately estimated, before being processed through a fixed (non-adaptive) fractionally-spaced equalizer and carrier phase recovery means as described above.

In the steady-state (burst) operation of the carrier phase estimator unit, the received signal, il, is first filtered through a fixed T/2-spaced equalizer 408 (FIG. 4) to compensate for any phase and amplitude variations experienced in the slow-varying fading environment. The tap coefficients of the fixed equalizer 408 are provided by the adaptive T/2-spaced equalizer 406 operated on the previous burst of the current link. We denote the tap coefficients of the adaptive equalizer 406 by $\{w(k,j,l);k=1, \ldots, L;l=1, \ldots, N\}$, where $w(k,j,l)$ is the k-th tap coefficient of the j-th burst of the l-th link. The parameters, L, maximum number of tap coefficients, and N, maximum number of existing neighbors of the target receiver (inviting node) are the design parameters and hence variable.

At the end of each j-th burst of the l-th link, the tap coefficients, $w(k,j,l)$, are stored in the memory 412. These tap coefficients are loaded into the fixed equalizer 408 for pre-compensating the phase and amplitude variations of the next (j+1-st) burst, assuming the channel is slowly changing from burst to burst for a given l-th link. The pre-compensated phase and amplitude of the complex signal is inputted to the carrier phase recovery unit where, $$i2(i,j,l) \sum_{k=1}^{L} w(k,j-1,l) \cdot i1(i-k,j,l) \text{ for } l=1, \ldots, N \quad 2)$$

Note that in the preceding notation, the index i is used interchangeably for either the i-th symbol position within the j-th burst or the sampling time, assuming that one sample per symbol processing is considered.

The delay block 402 in FIG. 4 is provided to account for all processing delays encountered in the fixed equalizer 408 and the carrier phase recovery unit 410, respectively.

In the present embodiment of the carrier phase estimation unit 410 in the steady-state (burst) mode, the multiplexed p pilot symbols of the l-th link are represented by $\{P(1,l), P(2,l), \ldots, P(p,l)\}$. For the carrier phase recovery system, only two opposite corners of the designated M-QAM (i.e., M=4, 16, 64 or 256) constellation points are used as defined by:

$$P(i,l)=r(i,l)e^{j\theta(i,l)},$$

$$P(i-1,l)=r(i-1,l)e^{j\theta(i-1,l)} \quad 3)$$

where $r(i,l)=r(i-1,l)$ and $\theta(i,l)=-\theta(i-1,l)=\pi/4$.

In a multiple link environment, the system 400 may receive bursts over several independent channels from different receivers. At some times, the system 400 may receive multiple bursts or a continuous transmission from a single transmitter. In the general case, though, the system 400 receives one burst from one transmitter on a first channel and subsequently, a second burst from the same transmitter on the same first channel. Bursts from one or more other transmitters are interspersed between the first and second bursts on the channel.

The system 400 thus receives a first burst of a first radio signal on a first radio link. For example, in FIG. 1, the node 102, which includes the system 400 in this example, may receive a burst on link 126 from node 108. The system 400 determines channel information, such as the carrier phase, about the first radio link using the first burst. The system 400 stores the equalizer weights, carrier phase or other channel information. The system 400 then receives a first burst of a second radio signal on a second radio link, such as the link 128 in FIG. 1. The system 400 determines channel information about the second radio link using the first burst of the second radio signal. The channel information for the second radio link is stored. Subsequently, the system 400 receives a next burst of the first radio signal on the first radio link, such as link 126 in FIG. 1, using the equalizer weights or other channel information.

Figure 5:
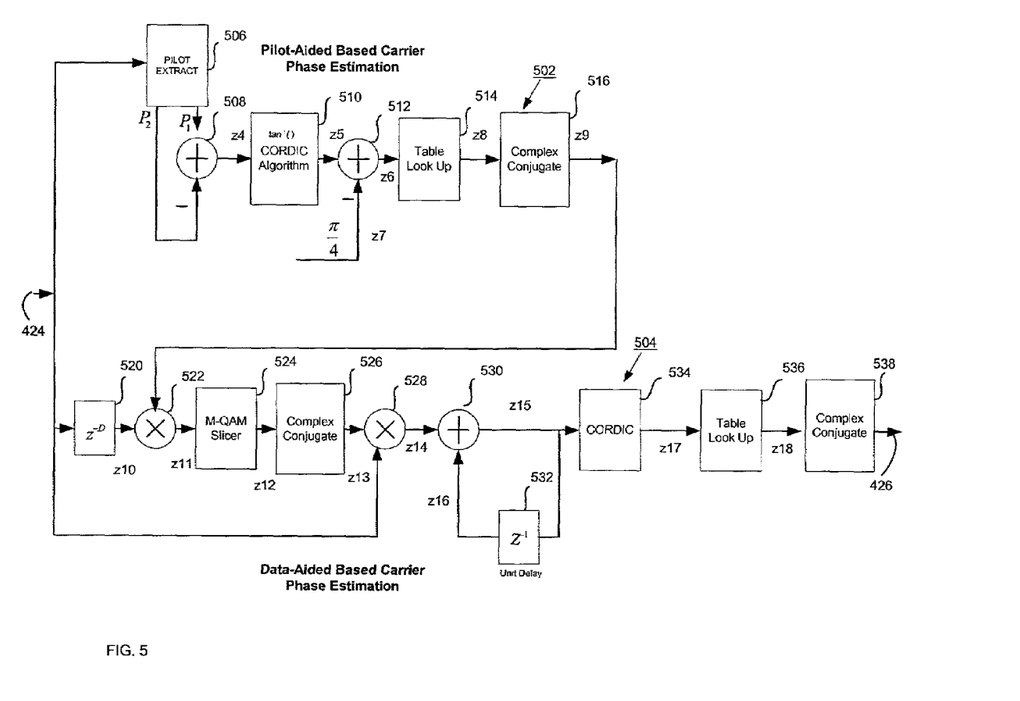
FIG. 5 is a detailed block diagram of a carrier phase recovery unit for burst-mode operation of the wireless network of FIG. 1.

One embodiment of the carrier phase recovery unit 410 is shown in greater detail in FIG. 5. FIG. 5 represents the details of carrier phase recovery unit in burst mode according to one embodiment. After the amplitude and phase variations of the received burst are compensated (minimized) through the fixed T/2-spaced equalizer for the l-th link (FIG. 4), a coarse estimate of the carrier phase, $\hat{\theta}(j,l)$, is obtained based on the p pilot symbols in the j-th burst of the l-th link, $\{P(1,j,l), \ldots, P(p,j,l)\}$. These known symbols are multiplexed periodically with the data symbols as shown in FIG. 3. Depending on the number of pilots inserted and the periodicity ($T_p = p+m$, p pilots for every m data symbols, m>>p ), conventional techniques known in prior art such as linear interpolation, low-pass filter interpolation, or Gaussian interpolation can be applied to obtain the estimates of the channel parameters.

In the preferred embodiment, the estimation of the phase and amplitude variations of the I/Q components of the available pilot symbols can be performed. The value of the amplitude information of a multiplicative distortion obtained by this method can also be used to enhance the precision of automatic gain control (AGC).

Another added advantage of these periodic pilot symbols is to reduce the impact of the phase noise. This benefit can be readily realized by performing a new estimate of the carrier phase (using the available p pilot symbols) every m data symbols. That is, after every m data symbols, a new estimate of the carrier phase could be provided. In this case, the phase estimate, $\hat{\theta}$, is updated every p+m symbols. These independent carrier phase estimates could be very instrumental to relax the impact of phase noise particularly in high-level QAM modulation schemes. Since the loop bandwidth of the feed-forward carrier phase recovery technique is inversely proportional to the period of the integration or estimation length of the observed symbols, it is desirable to increase the periodicity of the inserted pilots or equivalently to reduce the parameter, $T_p$. The pilot sequence period ($T_P$) is a design parameter which should be set based on a trade-off metric between the desired phase noise reduction and the throughput efficiency.

The carrier phase recovery unit 410 uses a pilot based and decision aided algorithm for phase estimation. The signal to be received is a series of bursts, each burst having a number of pilot symbols, preferably located near the center of then shortest burst. The carrier phase recovery unit 410 provides carrier phase recovery in burst mode applications.

The burst-mode of the carrier phase recovery unit 410 relies on a coarse estimate of the carrier phase utilizing p pilot symbols multiplexed with the data in the transmitted burst. In this embodiment, two opposite corner symbols (i.e., p=2) of the M-QAM constellation are assigned as pilot symbols. The current embodiment inserts these two known symbols adjacent to one another in the middle of the data stream in a pre-assigned time slot.

In a preferred embodiment, the pilot symbols can be used for estimation of multiplicative amplitude distortion of a fading channel. Pilot symbol assisted modulation (PSAM) is an alternative to a transparent tine-in-band (TTIB) method. The periodically inserted pilot symbols are interpolated to generate the estimates of time-varying channel parameters such as phase and amplitude distortions. These pilot symbols can be used to reduce the impact of the phase noise.

In order that the variations of amplitude and phase caused by the modulation of a carrier, the modulation must be removed. Such variations are from the distortions by the fading channel and other residual impairments caused by the radio transceiver. After the phase of the burst is de-rotated by a coarse estimate of the carrier phase, the modulating data of the information-bearing symbols are removed through a decision-directed phase recovery apparatus. The fine measurement of the phase is now carried out over these M symbols. The resulting unmodulated symbols are processed through a non-causal averaging unit to smooth out the carrier phase estimate of the first M symbols of the burst. The parameter M is selected based on the burst length and the channel condition. In the embodiment described herein, a value of M=32 is used. Other values could be used in other designs. This smoothing process, improves the accuracy of the estimated phase value significantly and enhances the reliability of the phase estimate through reducing the impact of the additive white Gaussian noise.

In the embodiment of FIG. 5, a two-stage phase recovery technique is used on each burst. Thus, the carrier phase recovery unit 410 includes a coarse carrier phase estimation circuit 502 and a fine carrier phase estimation circuit 504 to produce the recovered phase. The coarse carrier phase estimation circuit 502 is configured to produce a coarse estimate of the phase for the present burst of data using the pilot symbols of the present burst of data. The fine carrier phase estimation circuit 504 is coupled to the coarse carrier phase estimation circuit to produce the recovered phase using the coarse estimate of the phase and at least some of the data contained in the burst.

FIG. 5 illustrates the detailed block diagram of the carrier phase recovery unit 410 employed in a burst mode. After the received signal is phase and amplitude compensated by the fixed equalizer the pilot symbols, p1 and p2 are demultiplexed by the block 506 and processed to obtain a coarse estimate of the carrier phase. First, the pilot symbols located at the symbol positions i and i−1(i.e., 17th and 16th) of the current (j-th) burst of the l-th link are extracted. These two pilot symbols are then subtracted from each other by summer 508 to generate a complex signal:

$$z4(j,l)=p(i,l)-p(i-1,l)=2\alpha(i,l)\cdot r(i,l)e^{j(\phi(i,l)+\pi/4)}+n(i,l)-n(i-1,l) \quad 4)$$

where the preceding operation is done only once per burst. The indices j and l correspond to the j-th burst of the l-th link of the mesh network, respectively.

The phase of the complex signal, z4, is subsequently extracted using conventional techniques such as the known CORDIC scheme by CORDIC algorithm block 510. The summer 512 removes the residual phase bias value, π/4 in Equation 4), from the phase argument, z5, to produce a coarse estimate of the undesired phase distortion, $\hat{\phi}(j,l)$. The impact of the additive white Gaussian noise and any residual phase impairment from the circuit components are also reflected in the undesired phase estimate $\hat{\phi}(j,l)$. A complex signal, $z9=e^{-j\hat{\phi}(j,l)}$, is formed through using known techniques such as a look-up table unit 514 and a complex conjugate converter 516.

The pre-compensated complex signal is delayed by the delay block 520 to account for the processing delays encountered in the pilot-aided carrier phase recovery conducted in the previous stage. The complex delayed signal is now multiplied by the signal z9 in the multiplier 522 to counter-rotate the phase by the coarse phase estimate, $\hat{\phi}(j,l)$. The resulting complex signal, z11, already refined by the fixed equalizer and phase compensated by the aid of the pilot symbol means, are now provided to the slicer 524. The complex signal z11 is denoted by:

$$z11(i,j,l) = s(i,j,l) \cdot \alpha(i,j,l) e^{j[\theta(i,j,l) + \phi_e(i,j,l)]} + n(i,j,l) \quad 5)$$

$se^{j\theta}$ is the transmitted desired data. The residual undersired phase, $\phi_e$, $$\phi_e(i,j,l) = \phi(i,l) - \hat{\phi}(j,l) \quad 6)$$

is now reduced in magnitude and helps the slicer 524 to have negligible decision errors as described below.

In the next stage, a data-aided phase recovery scheme is used to remove the data-dependent phase portion of the received signal. In the previous stage, the undesired phase was estimated per burst for all N links based on the known pilot symbols. In this stage, the unknown data symbols of the entire burst or a portion of the burst are first estimated through a QAM slicer 524. The estimated phase of the data symbols is removed from the output of the fixed equalizer. At the input to the slicer 524, the complex signal has the form specified by equation 1).

However, the channel parameters are pre-compensated by the aid of the fixed equalizer and the pilot-based stage of the carrier phase recovery unit.

At the output of the slicer 524, the estimated data symbols, $\hat{s}(i,j,l)e^{j\hat{\theta}(i,j,l)}$, are removed from the complex signal z11. The resulting complex signal would be:

$$z14 = s(i,j,l) \cdot \hat{s}^*(i,j,l) \cdot \alpha(i,j,l) e^{j[\theta(i,j,l) - \hat{\theta}(i,j,l) + \phi_e(i,j,l)]} = s^2(i,j,l) \cdot \alpha(i,j,l) \; e^{j\phi_e(i,j,l)} \quad 7)$$

In equation 7), it is assumed that the detector has committed no errors and the impact of Gaussian noise is negligible.

The complex signal, z14, is averaged over M symbols and the phase is extracted using the CORDIC algorithm in the CORDIC algorithm block 534 analogous to the process described in the pilot-aided scheme, namely:

$$z15(j,l) = \sum_{i=0}^{M-1} z14(i,j,l) = \sum_{i=0}^{M-1} s^2(i,j,l) \cdot \alpha(i,j,l) e^{j\phi_e(i,j,l)} \quad 8)$$

$$\angle z15(j,l) = z17 = \Phi(j,l) \quad 9)$$

Note that each estimated carrier phase, $\Phi(j,l)$, of the j-th burst of the l-th link is independently calculated and is fixed for the entire j-th burst. The complex signal $i5 = e^{-j\Phi(j,l)}$ at the output 426 is formed using the table look up block 536 and complex conjugate block 538.

Referring again to FIG. 4, the received signal from the input 420 is delayed in delay block 402 and phase compensated in the multiplier 404 by the estimated carrier phase, $\Phi(j,l)$, to generate the complex signal z1 (ignoring the impact of the delay element 402) on line 428, where $$z1(i,j,l) = i1(i,j,l) \cdot e^{-j\Phi(j,l)} = [s(i,j,l) \cdot \alpha(i,j,l)] e^{j\{\theta(i,j,l) + \phi_e(i,j,l) - \Phi(j,l)\}} \quad 10)$$

The signal, z1, is further processed by an adaptive T/2-spaced equalizer 406 to compensate the amplitude and phase variation of the channel, $\alpha(i,j,l) e^{j\phi(i,j,l)}$. The resulting output signal, i7, at the output 422, is denoted as:

$$i7(i,j,l) = \sum_{k=1}^{L} w(k,j,l) \cdot z1(i-k,j,l) \text{ for } l = 1, \ldots, N \quad 11)$$

where the tap coefficients, $\{w(k,j,l), k=1, \ldots, L\}$, of the j-th burst of the l-th link are stored in the memory 430. These coefficients are uploaded into the fixed T/2-spaced equalizer 408 to pre-compensate the phase and amplitude variations of the next (j+1-st) burst of the l-th link.

The burst-mode of the carrier phase recovery unit relies on a coarse estimate of the carrier phase utilizing p pilot symbols multiplexed with the data in the transmitted burst. In the this invention, two opposite corner symbols (i.e., p=2) of the M-QAM constellation are assigned as pilot symbols. The current embodiment inserts these two known symbols adjacent to one another in the middle of the data stream in a pre-assigned time slot.

The coarse carrier phase estimation circuit 502 performs a pilot-aided carrier phase estimation. The coarse carrier phase estimation circuit 502 thus includes a pilot extraction block 506, a summer 508, a CORDIC algorithm block 510, a summer 512, a look up table block 514 and a complex conjugate block 516. The coarse carrier phase estimation circuit 502 estimates phase using the pilot symbols embedded in the burst.

The coarse carrier phase estimation circuit 502 is coupled to the equalizer 408 to receive the initial equalized input signal on line 424 from the equalizer 408 (FIG. 4). This signal is provided to the pilot extraction block 506 which locates the pilot symbols at a predetermined location in the burst. In the illustrated example, the pilot symbols are located near the center of the (short) burst. However, the pilot symbols may be located at any appropriate location, either together or separate, within the burst. In the illustrated example, the pilot extraction block 506 buffers all 32 samples of the (short) burst. The sixteenth and seventeenth samples are then selected as the pilot symbols $P_1$ and $P_2$. The extracted pilot symbols $P_1$ and $P_2$ are subtracted in the summer 508. The results of the subtraction are provided to the CORDIC algorithm block 510. The CORDIC algorithm is known in the art and useful for evaluating the inverse tangent of the input argument to obtain the phase of the subtracted corner points of the QAM constellation at $\pi/4$ radians. A fixed value of $\pi/4$ is subtracted from the output signal of the CORDIC algorithm block 510 to remove the $\pi/4$ bias from the pilots which are at the corners of the M-QAM constellation and produce an estimate of the phase angle. A table lookup operation is performed on the signal 26 in the block 514 to obtain sine and cosine values to form a complex phasor corresponding to the estimated phase angle. A complex conjugate operation is performed in the complex conjugate block 516 which is inputted to the fine carrier estimation block 504.

The fine carrier phase estimation circuit 504 extracts a data-aided carrier phase estimation. The fine carrier phase estimation circuit 504 includes a delay element 520, a multiplier 522, a QAM slicer 524, a complex conjugate block 526, a multiplier 528, a summer 530, a delay element 532, a CORDIC algorithm block 534, a table look up block 536 and a complex conjugate block 538. The delay element 520 is coupled to the equalizer 408 (FIG. 4) to receive the initial equalized input signal on line 424 from the equalizer 408 (FIG. 4). The delay element 520 delays the received signal during processing in the coarse carrier phase estimation circuit 502.

The multiplier 522 multiplies the delayed signal from the delay element 520 and the coarse carrier phase estimate. The multiplier 522 operates as a de-rotating circuit to receive an initial equalized signal to remove estimated coarse carrier phase from the initial equalized signal responsive to an estimate signal from the coarse carrier phase estimation signal. The signal from the complex conjugate circuit 516 is in the form of a complex phasor. The residual phase error, after the de-rotating circuit, is now much less in magnitude and helps the detector/slicer 524 to have negligible decision errors.

The de-rotator output signal is provided to the slicer 524. The slicer 524 makes a decision as to the symbol of the received signal.

The complex conjugate of the estimated transmitted data is evaluated in the complex conjugate block 526, which operates similarly to the complex conjugate block 516 of the coarse carrier phase estimation circuit 502. The result is multiplied by the received, equalized signal on line 424 in the multiplier 528 to remove the estimated phase of the data symbols from the fixed equalizer output. This signal is provided to the summer 530.

In the feedback loop including the delay element 532, the values are averaged over a predetermined number of data symbols. In different embodiments, the averaging occurs over some or all data symbols in a burst. In one example, a window of data symbols of a received burst is averaged. Averaging a predetermined number of symbols of the carrier estimate to reduce noise variance.

The inverse tangent is evaluated in the CORDIC algorithm block 534 to obtain an estimate of the phase angle. The sine and cosine are evaluated in the look up table block 536 and the complex conjugate is again evaluated, yielding the fine estimate of the carrier phase. The receiver circuit including the system 400 may subsequently process the received radio signals, such as correcting carrier phase for the radio signal using the fine estimation of carrier phase.

Figure 6:
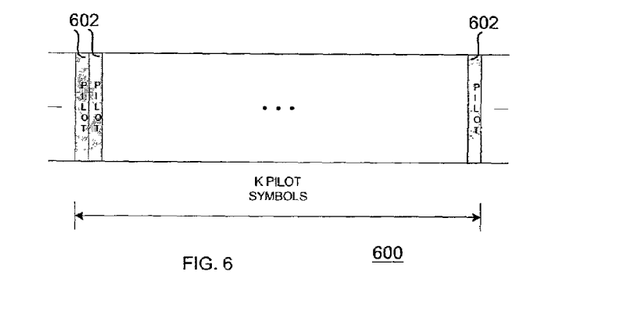
FIG. 6 shows the frame structure of transmitted burst for pilot acquisition in a pilot-aided acquisition unit employed in the joining process for the wireless network of FIG. 1.

FIG. 6 shows the frame structure 600 of a transmitted burst for pilot acquisition in a joining process for the wireless network 100 of FIG. 1. In the join mode, K known pilot symbols dedicated for the carrier phase estimation are multiplexed with other training sequences in the transmitted join frame as shown in FIG. 6

In the joining process, a new or joining node is added to an existing network of one or more nodes. For example, in the exemplary embodiment shown in FIG. 1, if node 106 is a joining node which is joining the network 100 which already includes node 102, 104, 108, node 106 must locate radio signals from other nodes in the network 100, including locating direction and frequency of the radio signals. Further, the node 106 must acquire timing synchronization with the other nodes using the radio signals. Still further, the joining node 106 must initiate communication with one or more existing nodes so that its presence can be recorded in the network.

In the embodiment of FIG. 6, a frame structure 600 for a transmitted burst includes all pilot symbols 602. The frame 600 is of duration K pilot symbols, where K may be any selected number. Transmitting only pilot symbols simplifies the joining process at the joining receiver. However, in alternative embodiments, other frame structures including other data content may be substituted. The frame structure 600 thus forms an invitation burst having data symbols and known pilot symbols at a known timing position inside the invitation burst.

In conjunction with the system shown in FIG. 4, the frame structure 600 may be used to fill the memory 412 with initial stored channel information. That is, the first burst generally received by the system 400 in a joining node wishing to join the network is an invitation burst as illustrated in FIG. 6. After equalization by the adaptive T/N spaced equalizer 406, the equalizer weights are stored in the memory. The equalizer weights form link parameters for the new radio link from an established node in the network to the joining node. The link parameters or equalizer weights are stored as initial channel information. Upon receipt of subsequent bursts, the link parameters may be updated. If either another invitation burst or a data burst is received from the established node on the new radio link, the stored channel information may be updated with new equalizer weights which reflect variation in the channel.

Figure 7:
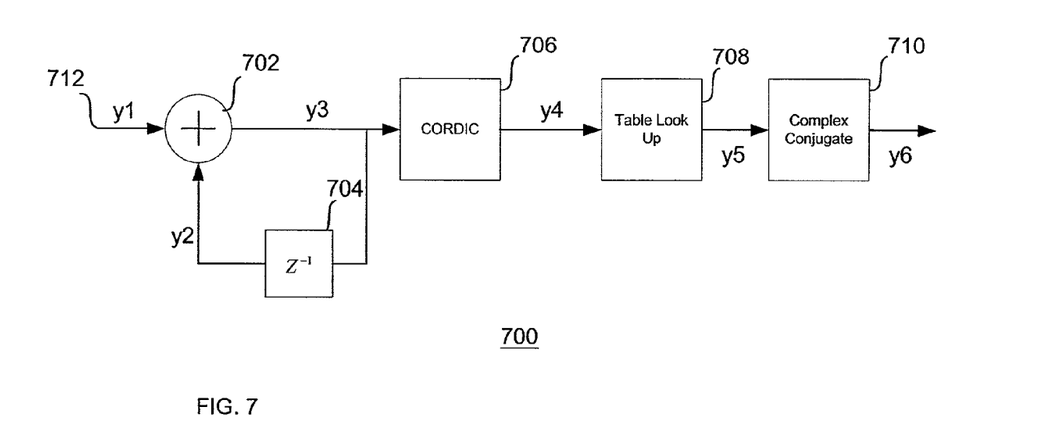
FIG. 7 is a detailed block diagram of a carrier phase recovery unit for the joining process of the wireless network of FIG. 1.

FIG. 7 is a block diagram of a carrier phase recovery unit 700 for use in the joining process to add a new node to the wireless network 100 of FIG. 1. The carrier phase recovery unit 700 includes a summer 702, a delay element 704, a CORDIC algorithm block 706, a look up table block 708 and a complex conjugate block 710. The carrier phase recovery unit 700 receives an equalized input signal y1 at the input 712. The input signal in one embodiment has the frame structure shown in FIG. 6. That is, the input signal consists of all pilot symbols. The feedback loop including the summer 702 and the delay element 704 operates to average the received symbols over a window of samples.

The inverse tangent is evaluated in the CORDIC algorithm block 706 to obtain an estimate of the carrier phase angle. The sine and cosine are evaluated in the look up table block 708 and the complex conjugate is evaluated in the complex conjugate block 710, yielding an estimate of the carrier phase for the pilot symbol transmission. The receiver circuit including the system 700 may subsequently process the received radio signals, such as correcting carrier phase for the radio signal using the fine estimation of carrier phase.

The pilot symbols, $r(i,l)e^{j\Theta(i,l)}$, are extracted and averaged over K symbols to produce the estimated phase, $\Phi(l)$ as shown in FIG. 7:

$$y3(l) = \sum_{i=0}^{K-1} y1(i, l) = \sum_{i=0}^{K-1} r(i, l) \cdot \alpha(i, l) e^{j\varphi(i,l)} \quad 12)$$

$$\angle y3(l) = y4(l) = \Phi(l) \quad 13)$$

where the indices i and l denote the i-th pilot symbol position and the l-th link of a mesh network, respectively.

Finally, the incoming complex signal is counter-rotated by the estimated phase, $\Phi(l)$, to compensate for the undesired phase induced by the channel and other phase impairment introduced in the transceiver radio.

From the foregoing, it can be seen that the present embodiments provide a method and apparatus for carrier phase recovery in a burst mode system. Information about the radio link, such as equalizer weights appropriate for the link, is stored for subsequent use in a receiver. For carrier phase recovery, first a coarse estimate is made of carrier phase using pilot symbols of the received data. The coarse estimated is then used for making a fine estimate in a data-directed carrier phase recovery technique.

While a particular embodiment of the present invention has been shown and described, modifications may be made. The operational blocks shown in the block diagrams of the drawing may be embodied as hardware components, software code operating in conjunction with hardware, or a combination of the two. Implementation of such functions in hardware, software or a combination thereof is well within the purview of those ordinarily skilled in the appropriate art. Further, such illustrated functionality may be combined with other operations by way of modification. Accordingly, it is therefore intended in the appended claims to cover such changes and modifications which follow in the true spirit and scope of the invention.

What is claimed is:

1. A carrier phase recovery system comprising:
    a first equalizer configured to equalize a present burst of data using equalizer weights from a previous burst of pilot symbols and data symbols, the present burn of data including pilot symbols and data symbols;
    a carrier phase recovery unit which recovers phase for the present burst of data using the equalized pilot symbols the present burst;
    a mixer combining a delayed version of the present burst and the recovered phase to produce a phase-error compensated signal; and
    a second adaptive equalizer which equalizes the phase-error compensated signal to produce an equalized output signal and provides next burst equalizer weights to a memory to be timely applied to the first equalizer for equalizing a next burst of data on a link.

2. The carrier phase recovery system of claim 1 wherein the memory is a Random Access Memory (RAM) coupled to the second equalizer to store the next burst equalizer weights.

3. The carrier phase recovery system of claim 1 wherein the carrier phase recovery unit comprises:
    a coarse carrier phase estimation circuit; and
    a fine carrier phase estimation circuit to produce the recovered phase.

4. The carrier phase recovery system of claim 3 wherein the coarse carrier phase estimation circuit is configured to produce a coarse estimate of the phase for the present burst of data using the pilot symbols of the present burst of data.

5. The carrier phase recovery system of claim 4 wherein the fine carrier phase estimation circuit is coupled to the coarse carrier phase estimation circuit to produce the recovered phase using the coarse estimate of the phase and at least some of the data.

6. The carrier phase recovery system of claim 5 wherein the fine carrier phase estimation circuit is coupled to the first equalizer to receive an initial equalized signal.

7. The carrier phase recovery system of claim 6 wherein the coarse carrier phase estimation circuit is coupled to the first equalizer to receive the initial equalized signal.

8. The carrier phase recovery system of claim 3 wherein the fine carrier phase estimation circuit comprises a de-rotating circuit coupled to the first equalizer to receive an initial equalized signal to remove estimated coarse carrier phase from the initial equalized signal responsive to an estimate signal from the coarse carrier phase estimation circuit.

9. The carrier phase recovery system of claim 8 wherein the de-rotating circuit is coupled to the coarse carrier phase estimation circuit to receive a phasor signal as the estimate signal.

10. The carrier phase recovery system of claim 3 wherein the fine carrier phase estimation circuit is configured to remove a modulated signal from a carrier to produce the recovered phase.

11. The carrier phase recovery system of claim 10 wherein the fine carrier phase estimation circuit comprises a data-aided decision-directed apparatus to remove the modulated signal from the carrier.

12. The carrier phase recovery system of claim 11 wherein the fine carrier phase estimation circuit comprises an averaging circuit coupled to the data-aided decision-directed apparatus to reduce noise in the carrier.

13. A carrier phase recovery system for use in a multiple-link hopping and burst adaptive modem in steady state operation, the carrier phase recovery system comprising:
    a memory;
    a fixed equalizer for pre-compensating amplitude and phase variations of a present data burst of a present link through the fixed equalizer for which the tap coefficients pertinent to a previous burst of the present link are loaded from the memory, the fixed equalizer producing a pre-compensated amplitude and phase signal;
    a carrier phase recovery unit extracting distorted carrier phase for a plurality of communication links, the carrier phase unit including:
    a first stage which acquires a coarse estimate of the distorted carrier phase using a pilot-aided technique using multiple known pilot symbols contained in the present burst of data;
    a fixed phase bias removal stage coupled to the first stage;
    a complex conjugate phasor generating stage coupled to the fixed phase bias removal stage;
    a de-rotating means for de-rotating the equalized signal by a phasor signal generated by the phasor generating stage to remove estimated coarse carrier phase from the equalized signal to produce a coarse phase compensated signal;
    a data-aided phase estimator stage for removing modulated signal from the coarse phase compensated signal using a data-aided, decision-directed technique; an averaging means for averaging M symbols from the data-aided phase estimator stage to reduce noise variance; and
    an adaptive equalizer stage for generating the tap coefficients and storing the tap coefficients in the memory.

* * * * *